April 21, 1936.   C. S. BRAGG ET AL   2,037,758
VACUUM BRAKE SYSTEM FOR AUTOMOTIVE VEHICLES
Original Filed Nov. 14, 1929   4 Sheets-Sheet 2

Patented Apr. 21, 1936

2,037,758

UNITED STATES PATENT OFFICE 2,037,758

VACUUM BRAKE SYSTEM FOR AUTOMOTIVE VEHICLES

Caleb S. Bragg, Palm Beach, Fla., and Victor W. Kliesrath, South Bend, Ind., assignors to Bragg-Kliesrath Corporation, South Bend, Ind., a corporation of New York Substitute of application Serial No. 407,036, November 14, 1929. This application October 1, 1931, Serial No. 566,304. Renewed November 10, 1933

21 Claims. (Cl. 188—3)

Our invention consists in the novel features hereinafter described, reference being had to the accompanying drawings which illustrate several embodiments of the invention selected by us for purposes of illustration, and the said invention is fully disclosed in the following description and claims.

Our invention is an improved vacuum brake system operating under differentials of fluid pressures between a partial vacuum obtained by connection with the throttle controlled suction passage of an internal combustion engine and the higher pressure fluid, as atmospheric air for example, in which a main vacuum power actuator of the type in which the piston is pressure-balanced, when in the released position, and a physically operable main controlling valve mechanism for said actuator are operatively combined with an auxiliary power actuator of the type in which the piston is vacuum-balanced, when in the released position, and automatically operated controlling valve mechanism for the vacuum-balanced actuator responsive to variations in pressure in the main actuator cylinder. Both actuators operate under substantially the same differentials of fluid pressures and under the control of the valve mechanism for the main actuator. The main and auxiliary actuators may be located upon the same vehicle for the operation of the brake mechanisms thereof, or they may be located respectively on a tractor or trailer for example, to operate the brake mechanisms of both vehicles simultaneously. In either case the power for braking purposes is increased without danger of admitting at any time into the suction passage of the engine sufficient quantities of air to interfere with the operation of the engine or stall it if idling, as air is withdrawn from the pressure-balanced actuator only during the power stroke of the piston thereof, and is withdrawn from the vacuum-balanced actuator only during the return stroke of the piston thereof to the released position.

Our invention is especially adapted for a light weight truck and a trailer, the truck having engine cylinders of comparatively small capacity compared with the total loads that may be propelled thereby, the truck being provided with a brake mechanism which can be effectively operated by a power actuator of the pressure-balanced type without stalling the motor of the truck while idling. If a trailer of considerable size were to be propelled by the truck and were equipped with a power actuator of the pressure-balanced type, operatively connected with the power actuator of the truck and therethrough with a suction passage of the engine of the truck, so much air would be exhausted into the suction passage in the simultaneous operation of both actuators, that the motor would stall. According to our invention, however, we supply the trailer with a power actuator of the vacuum-balanced type operable to apply the brakes without admitting any appreciable quantity of air to the suction passage. Such a vacuum-balanced actuator cannot be directly controlled by the valve mechanism for a pressure-balanced actuator, and the simultaneous control of the vacuum-balanced actuator is therefore obtained by an auxiliary automatically operating valve. It is to be understood, however, as before stated that both actuators may be mounted on the same vehicle, as a truck or bus for example, and this construction is particularly advantageous where a larger amount of braking power is required than can be obtained by the use of a pressure-balanced actuator without danger of stalling the engine.

Referring to the accompanying drawings which illustrate several embodiments of the invention.

Figure 1:
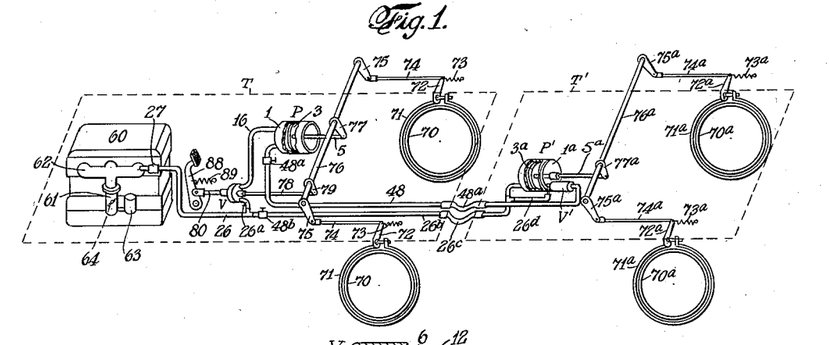
Figure 1 is a diagrammatic view of our improved vacuum brake system applied to a truck and trailer.
Figure 2:
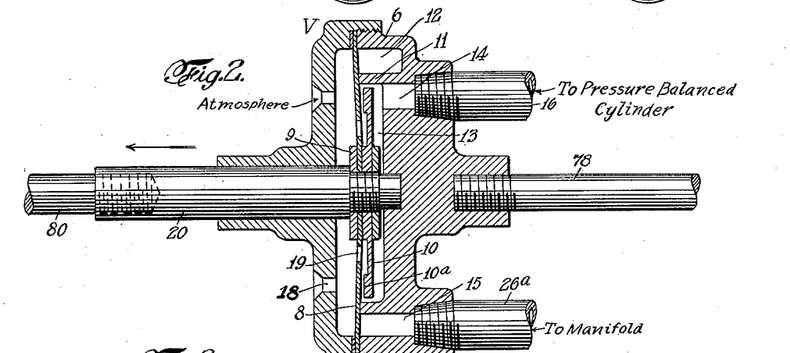
Figure 2 is an enlarged sectional view of one form of main valve mechanism shown in Figure 1, which may be employed for controlling the main actuator.

Referring to the form of our invention illustrated in Figures 1 to 8 inclusive, we have shown in Figure 1 diagrammatically a tractor vehicle indicated by dotted lines at T, and a trailer indicated by dotted lines at T¹. The tractor is shown provided with an internal combustion engine 60 for propelling the vehicle, which has the usual throttle suction passage comprising the vertical portion 61 and intake manifold 62. 63 represents the carburetor, and 64 the usual valve interposed between the carburetor and the engine cylinders. The tractor is shown provided with a main power actuator, indicated at P, and comprising a cylinder 1 open at one end and closed at the other, and having a piston 3, the piston rod 5 of which is connected with brake mechanism of the tractor vehicle, which may be of any desired type and may be applied to as many of the wheels of the vehicle as preferred. In the present instance, for purposes of illustration, we have shown two rear wheel brake mechanisms of usual type, each comprising in this instance a brake drum 70, a brake band 71 and brake applying lever 72 with its usual retracting spring 73. The brake applying levers are shown connected by links 74, 74 with arms 75, 75 on a rock shaft 76 having an arm 77 operatively connected with the power actuator P, in this instance being connected to the piston rod 5 thereof, it being understood that the cylinder 1 is in this instance rigidly connected with the chassis. The actuator P is of the type in which the piston is exposed to the higher pressure fluid, i. e., atmosphere at all times on its rear face, and is exposed on its forward face to atmospheric pressure when the brakes are in released position. For convenience of reference, we term this type of actuator the pressure-balanced type. The actuator P is controlled by a suitable valve mechanism constructed to connect the closed end of the cylinder 1 with the atmosphere or with a source of suction, or to disconnect it from both, and the valve mechanism is operatively connected with physically operable means, which is preferably the usual pedal lever, indicated at 88, provided with the customary retracting spring 89. In this instance we have shown a form of main controlling valve mechanism illustrated in detail in Figure 2, which is covered by our United States Letters Patent No. 1,803,957, granted May 5, 1931, and which therefore forms no part of our present invention. It will, however, be briefly described, in order that the operation of the brake system may be understood. It is to be understood, however, that any other type of valve mechanism which will accomplish the same purpose may be employed. The controlling valve mechanism, indicated as a whole at V, comprises a casing 6, preferably formed of two parts connected together and clamping the edges of a diaphragm valve 8 which divides the casing into two compartments. One member of the casing is provided with an annular diaphragm engaging seat 11, which further divides the space within said casing into a centrally located chamber 13 and an annular suction chamber 12 when the diaphragm is seated firmly upon the seat 11. The chamber 13 is provided with an aperture 14 connected by a flexible pipe 16 with the closed end of the cylinder 1, forward of the piston therein, and the suction chamber 12 is provided with an aperture 15 connected by a flexible suction pipe with the suction passage of the engine between the throttle valve and the engine cylinders. In this instance we have shown the annular suction chamber 12 connected by a short flexible pipe 26ᵃ with a suction pipe 26 leading to the intake manifold 62 of the engine, and provided with a check valve 27. Within the chamber 13 of the valve casing is located a disc valve 10 having an annular diaphragm engaging seat 10ᵃ. The portion of the valve casing on the opposite side of the diaphragm from the chamber 13 is at all times in communication with the atmosphere, in this instance through apertures 18, and the diaphragm itself is provided with apertures 19 within the seat 10ᵃ for establishing communication between chamber 13 and the atmosphere, when the disc valve 10 is unseated, as shown in Figure 2. The diaphragm 8 and disc valve 10 are connected rigidly and sealingly to a valve actuating part 20, movable with respect to the casing and extending through an aperture therein. The part 20 has a limited amount of movement with respect to the casing determined by a collar or washer 9 on the part 20, which engages the inner face of the casing when the part 20 has been moved a predetermined distance in the direction of the arrow, Figure 2, that is to say far enough to bring the seat 10ᵃ of the disc valve into engagement with the diaphragm and disengage the diaphragm from its seat 11.

The valve mechanism is preferably interposed in linkage or rodding between the brake pedal 88 and brake mechanisms of the vehicle. In this instance the valve casing is connected by a rod or link 78 with an arm 79 on the rock shaft 76, and the valve actuating part 20 is connected by a rod or link 80 with the foot pedal.

It will be seen that when the valve mechanism is in released position, as shown in Figure 2, the closed end of cylinder 1 forward of the piston is in communication with the atmosphere through pipe 16, chamber 13 and air inlet apertures 18 and 19, so that the piston is pressure-balanced and the brakes and piston are in retracted position by reason of the retracting spring 73.

P¹ represents an auxiliary power actuator located on the trailer T¹, and comprising a cylinder 1ᵃ closed at both ends and in this instance secured to the chassis of the trailer and having a piston 3ᵃ in the cylinder provided with a piston rod 5ᵃ. The trailer is provided with brake mechanisms of any desired type and have any desired number of wheels thereof. In this instance we have shown the trailer provided with brake mechanisms similar to those on the tractor and previously described, the parts being indicated by the same reference numerals with the addition of "a". The piston rod 5ᵃ is shown connected to an arm 77ᵃ on the rock shaft 76ᵃ for operating the trailer brake mechanism.

Figure 3:
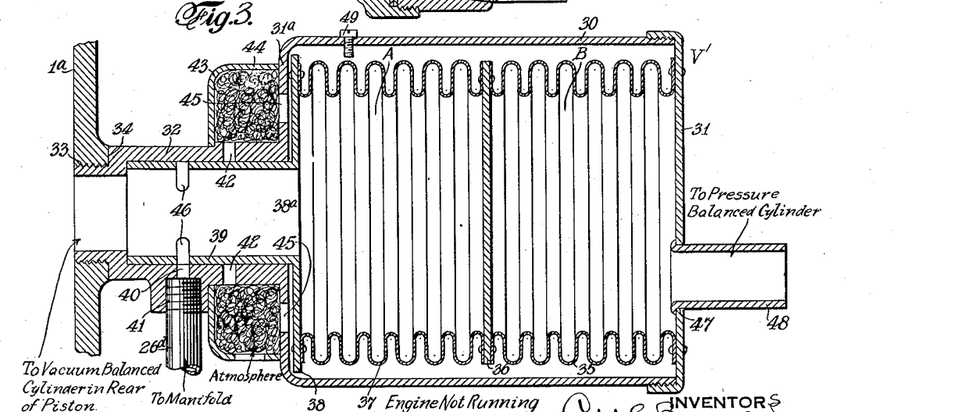
Figure 3 is an enlarged sectional view of the automatic valve mechanism for the auxiliary trailer, the parts being in the position which they will occupy when the engine is not running.
Figure 4:
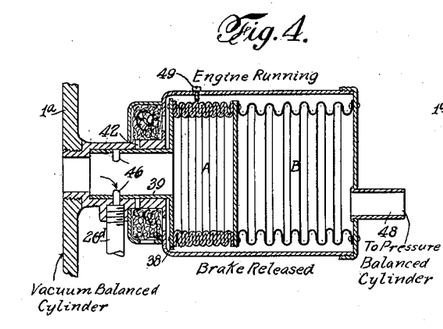
Figure 4 is a similar sectional view of the automatic valve mechanism drawn to a small scale and showing the parts in the positions which they occupy when the engines are running and the brakes are released.
Figure 5:
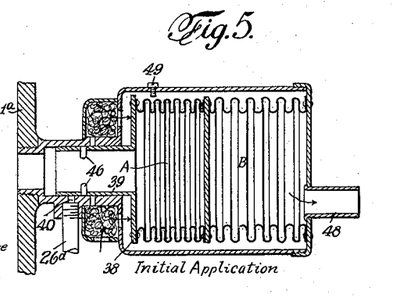
Figure 5 is a view similar to Figure 4 showing the position of the parts immediately after the operation of the main valve to apply the brakes.
Figure 6:
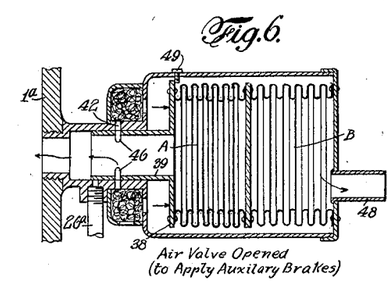
Figure 6 is a similar view showing the parts in position to effect an operation of the auxiliary actuator.
Figure 7:
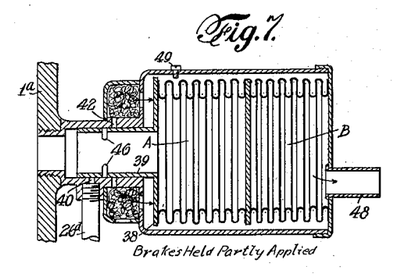
Figure 7 is a similar view showing the parts in position to hold the brakes operated by the auxiliary actuator as applied at less than the maximum power of the actuator.
Figure 8:
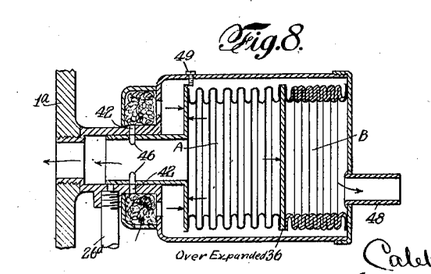
Figure 8 is a similar view showing the position of the parts when the brakes operated by the auxiliary actuator are fully applied.

The power actuator P¹ is of the type in which the portions of the cylinder on both faces of the piston are connected with the suction passage when the parts are in the released position, so that the piston is vacuum-balanced. The forward end of the cylinder 1ᵃ is connected with the intake manifold by an extension 26ᵇ of the suction pipe 26ᵃ, which is provided with the usual flexible section 26ᶜ between the vehicles. The cylinder 1ᵃ in rear of the piston is connected alternately with the manifold and with the atmosphere, or disconnected from both, by means of an automatic valve mechanism, indicated at V¹ and illustrated in detail in Figures 3 to 8 inclusive. This valve mechanism comprises two separate expansible and contractable pressure chambers movable with and with respect to each other, one of said chambers being connected with the actuator cylinder 1ᵃ in rear of the piston, and the other chamber being connected with the cylinder 1 of the main actuator P on the forward side of its piston, the movements produced by the variable pressures in said chambers operating to connect the cylinder 1ᵃ in rear of the piston with the suction passage of the engine or with the atmosphere, or to disconnect it from both. In the specific form of automatic valve mechanism herein shown in Figures 3 to 8, 30 represents a metallic shell or casing closed at its outer end by a cap or cover 31 and provided at its forward end with a sleeve 32, the outer extremity of which is preferably provided with a reduced threaded portion 33 and shoulder 34, so that the threaded end of the sleeve 33 may be secured into a suitable threaded aperture in the rear end of cylinder 1ᵃ, as shown in Figure 3, to support the automatic valve mechanism from the cylinder and connect it therewith. This avoids intermediate pipe connections and brackets or other devices for supporting the automatic valve mechanism. Within the casing 30 are two collapsible and expansible chambers A and B, formed preferably of metal. As shown the chamber B is formed by a corrugated flexible cylindrical part 35, rigidly and sealingly connected at one end to the wall 31 of the casing 30 and having its opposite end connected sealingly to a movable partition 36 forming a metal bellows. The chamber A is formed by a similar corrugated part 37, sealingly connected with the partition plate 36 and having its opposite end connected with a movable plate 38, thus forming a second metal bellows. It will be understood that the corrugated cylindrical parts 35 and 37 are resilient, and when expanded or contracted tend to assume their normal positions by a spring-like action, and the use of springs therewith is ordinarily unnecessary. The plate 38 has a central aperture 38ᵃ and a projecting valve sleeve 39 coaxial with said aperture and engaging the supporting sleeve 32 with a sealing fit. The supporting sleeve 32 is provided with a suction port 40 communicating with an aperture 41 for the reception of a suction pipe 26ᵈ, which in this instance is connected with the pipe 26ᶜ. The sleeve 32 is also provided with air ports 42, 42, communicating with the atmosphere through a cleaning chamber 43 secured to the outside of the sleeve and provided with absorbent material 44. The front wall 31ᵃ of the main casing is also provided with air inlet apertures 45, which are always in communication with the atmosphere through the strainer casing 43. The valve sleeve 39 is provided with ports 46 adapted to be brought into registration with the suction port 40 or the air ports 42, or to occupy a position between the suction and air ports, in which communication between the valve sleeve and both suction and air ports will be cut off. The wall 31 of the valve casing 30 is provided with an aperture, indicated at 47, to receive a pipe 48 which connects the chamber or bellows B with the closed end of cylinder 1 of the main power actuator. This pipe is provided also with a flexible connection 48ᶜ between the tractor and trailer. When the engine is not running and there is therefore no suction, the chambers A and B will occupy substantially equal spaces within the casing 30 and the valve sleeve 39 will be held in position due to the resilient action of the corrugated parts 35, 37 to connect the port or ports 46 with the suction pipe 26ᵈ, as shown in Figure 3. When the engine is started and suction is produced in the intake manifold, the suction pipe 26 and its branches 26ᵃ, 26ᵇ, 26ᶜ and 26ᵈ, will be evacuated, and as the branch pipe 26ᵈ is in communication through the registering ports 40 and 46 of the automatic valve mechanism, the chamber A thereof and also the portion of the auxiliary actuator P¹ in rear of the piston will be evacuated, and at the same time the portion of the cylinder P¹ forward of the piston will likewise be evacuated, so as to maintain the piston submerged in vacuum or vacuum-balanced. The effect of the reduction of pressure within the chamber A is to contract it, as both faces 38 and 36 are exposed to atmospheric pressure, as indicated in Figure 4, and to expand the chamber B due to the atmospheric pressure acting upon the area of the partition 36, which is substantially greater in area than the area of the valve sleeve 39. The chamber B is, of course, open to the atmosphere through pipe 48, actuator cylinder 1, pipe 16 and the main controlling valve mechanism, which is in the position indicated in Figure 2. When the operator desires to apply the brakes of the tractor and trailer, he depresses the pedal lever 88, in the usual manner, to a greater or less extent. The first movement of the pedal will pull the valve actuating part 20 (Figure 2) in the direction of the arrow, seating the disc valve 10 on the diaphragm and closing off communication with the atmosphere through apertures 19 and 18, after which the diaphragm will be drawn away from its seat 11 so as to place the cylinder 1 of actuator P in communication with the suction pipe 26ᵃ, 26, and the withdrawal of air from the actuator P and from pipe 48 and chamber B of the automatic valve mechanism will immediately follow. The effect of this within the cylinder 1 of actuator P is to cause a forward movement of the piston 3 in a direction to apply the brakes of the main or tractor vehicle. The effect of the reduction of pressure within the chamber B of the automatic valve mechanism, as illustrated in Figures 5 and 6, is as follows. As the pressure is reduced in chamber B, the air pressure on the forward face or plate 38 of chamber A will move the chamber A bodily rearward (to the right in the drawings), compressing chamber B, and first cutting off communication between ports 46 and suction port 40, as shown in Figure 5, and thereafter bringing ports 46 into registration with the air inlet ports 42, as shown in Figure 6. Air immediately rushes into the valve sleeve 39, and into the chamber A, and into the cylinder 1ª of the auxiliary power actuator P¹, in rear of the piston, causing the piston 3ª to move forward and apply the trailer brakes, but without withdrawing any air from the auxiliary cylinder 1ª, forward of the piston, which was already evacuated. As the air for operating power actuator P¹ is admitted at a point very close to the actuator, and as the operation of the automatic valve mechanism is effected by a mere reduction of pressure in the chamber B thereof, the main and auxiliary actuators operate nearly simultaneously, and the lag in the operation of the auxiliary actuator, which would occur if the air had to come through a long pipe from the main valve V, is, of course, avoided. The brakes of the tractor and trailer will also be applied with substantially equal pressures.

Where the brakes are applied with less than the maximum force of the actuator by a movement of the pedal lever through less than its range of movement, when the operator stops the forward movement of the pedal, the valve casing of the main valve mechanism will be moved by the piston 3 of the main actuator through rock shaft 76, arm 79 and rod 78 in the direction of the arrow, Figure 2, with respect to the valve actuating part 20 until the diaphragm is seated on the seat 11, without unseating the disc valve from the diaphragm, thus cutting off the cylinder 1 from suction and holding the tractor brakes as applied. Further rarification in the cylinder 1 and in the chamber B connected therewith will, therefore, not take place, and as the admission of air into chamber A and the cylinder 1ª, in rear of the piston, decreases the rarification therein, and the spring-like action of the corrugated part 37 will expand it sufficiently to disconnect the ports 46 from the air ports 42, shutting off the air, but will not expand sufficiently to reconnect the ports 46 with the suction port 40. This action will therefore prevent the admission of further atmospheric air into the auxiliary actuator in rear of its piston, and the trailer brakes will be held as applied. The shifting of the valve sleeve 39 of the automatic valve mechanism occurs nearly simultaneously with the movement of the main valve which brings the diaphragm into engagement with the seat 11, so that the brakes are applied and held substantially simultaneously.

A further depression of the pedal, again unseating the diaphragm 8 and connecting the main cylinder with suction, will produce a further reduction of pressure therein and in chamber B, accompanied by the reconnection of the rear end of cylinder 1ª with the atmosphere (as in Figure 6), and a further application of power by both actuators to their respective brake mechanisms. When the pedal has been depressed far enough to effect maximum exhaustion in the actuator cylinder and apply the main brakes by the maximum power of the main actuator, the ports 46 of the automatic valve mechanism will have been brought into full registration with the air ports 42 and the plate 38 of the chamber A will have been brought into engagement with stops 49. The air pressure within chamber A, acting upon the inner face of the partition wall 36, will permit maximum expansion of chamber A and effect maximum compression of chamber B, in which the maximum vacuum will then exist, and insure the full opening of the atmospheric ports. The substantially simultaneous release of the brakes of tractor and trailer may be obtained by relieving pressure on the foot lever to allow the diaphragm 8 of the main valve to seat and the disc valve to be unseated, thus connecting cylinder 1 and chamber B with the atmosphere. The increase of pressure in chamber B will permit it to expand, pushing chamber A and sleeve 39 to the left (in Figure 8), closing the atmospheric ports 46 and then opening the suction port 40, as in Figure 8, reconnecting chamber A and the rear end of cylinder 1ª with suction, thereby withdrawing the air previously admitted and permitting the return stroke of the piston, and all of the brakes and the pistons of the main and auxiliary actuators will be returned to normal position by the actuation of their retracting springs. A partial release of the brakes of both vehicles can be effected at any time by stopping the return movement of the pedal and so preventing the full expansion of the chamber A and the full contraction of chamber B, which will hold the valve in the neutral position shown in Figure 5, and the brakes can be further applied from any intermediate position by further depression of the pedal.

It will also be understood that when the brakes of both vehicles have been fully applied, a further depression of the pedal will bring the collar 9 (see Figure 2) on the valve actuating part 20 into contact with the valve casing and permit the operator to add his physical force to the tractor brakes. In like manner the tractor brakes can be operated by the physical force of the operator alone in case of failure of power by taking up the lost motion provided between the collar 9 and the valve casing, in which case the valves will first have been moved into a position to connect the cylinder with the suction pipe and thus vent the cylinder 1.

In case it is desired to operate the tractor without the trailer, we have provided the pipe 48 with a cut-off valve 48ª and the suction pipe 26ᵇ with a cut-off valve 48ᵇ. When these valves are closed, the main actuator only will be operated by the main valve V and the flexible portions 26ᶜ and 48ᶜ, of the pipes 48 and 26ᵇ may be disconnected.

In the operation of our improved vacuum brake system, it will be noted that air is never withdrawn from both actuators at the same time. It is withdrawn from the main actuator P during the power stroke, while air is admitted to the previously exhausted auxiliary power actuator P¹ in rear of its piston without admitting air to the manifold, and on the return strokes of the respective pistons air is withdrawn from the actuator P¹ in rear of its piston and is admitted to the actuator P forward of its piston. It will also be seen that the operation of the two actuators of different types is nearly simultaneous and is under the control of the main valve mechanism P. The automatic valve mechanism is directly responsive to changes of pressure within the main cylinder under the control of the main valve mechanism, and one of its chambers is under maximum contraction when the other is under maximum expansion. As one chamber contracts, the valve ports are controlled so as to effect the expansion of the other chamber.

Figure 9:
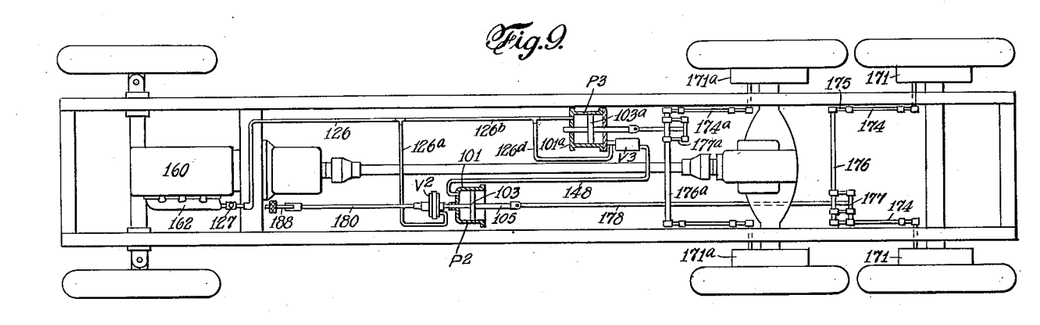
Figure 9 is a diagrammatic view showing the brake system applied to operate brake mechanism for different wheels of the same vehicle.

In Figure 9 we have shown our improved brake system applied to a single vehicle, as a truck or bus, provided with brake mechanisms for a plurality of pairs of wheels, the brake mechanisms of one pair being connected to the piston of the main actuator P² by means of linkage having incorporated therein an equalizer of well-known construction which, however, forms no part of the instant invention, and the brake mechanisms for the other pair of wheels being connected to the auxiliary actuator P³ by a similar linkage. The parts corresponding with those shown and previously described with reference to Figures 1 to 8 are given the same reference numerals with the addition of 100, and as the operation is exactly the same as that previously described, its description need not be repeated. In this figure the brakes are shown as internal brakes of known character, brake mechanisms for the rear wheels being indicated at 171, and the brake mechanisms for the intermediate wheels being indicated at 171ª.

Figures 10, 11:
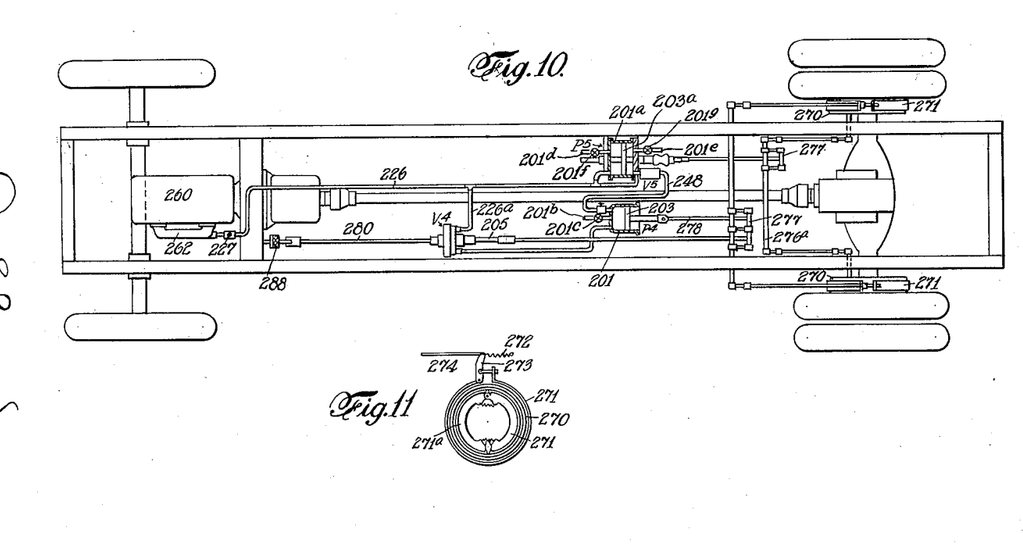
Figure 10 is a similar view showing our braking system applied to operate different brake mechanisms for the same pair of wheels of a single vehicle.
Figure 11 is a detail view illustrating the internal and external brake mechanisms of the vehicle shown in Figure 10.

In Figures 10 and 11 we have shown a diagram similar to Figure 9, illustrating the application of our improved brake system to a single vehicle having each of its rear wheels provided with an external brake band 271 engaging the brake drum 270 and with interior brake shoes, indicated at 271ª, engaging the interior of the same brake drum. In this figure the main actuator P⁴ has its piston connected with external brakes, the interconnecting linkage including equalizer mechanism forming, however, no part of the instant invention, while the auxiliary actuator P⁵ has its piston connected with the internal brakes by means of similar linkage. The other parts shown in this figure which correspond with those previously described with reference to Figures 1 to 8 are given the same reference numerals with the addition of 200.

Figure 12:
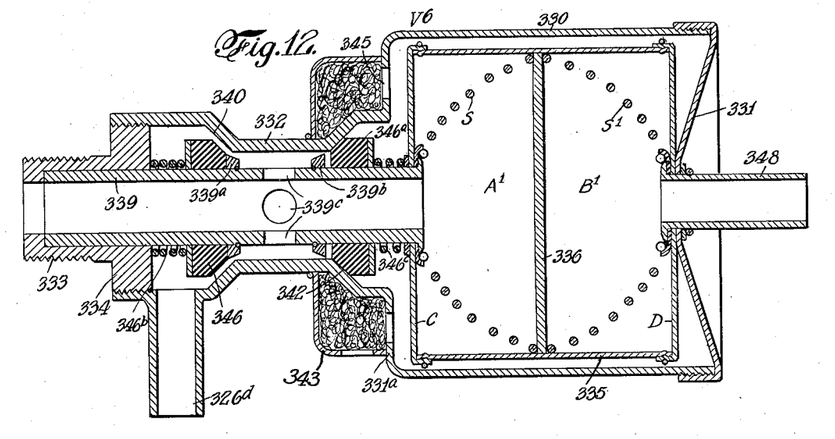
Figure 12 is an enlarged sectional view similar to Figure 3 showing a modified form of automatic valve for controlling the auxiliary actuator, illustrating the position of the parts when the engine is not running.

In Figure 12 we have shown a modified form of automatic valve for controlling the auxiliary vacuum-balanced actuator. In this construction of valve, indicated as a whole at V⁶, 330 represents the valve casing, preferably cylindrical and provided at one end with a detachable cover plate 331 having a central aperture to receive the pipe 348 to be connected with the cylinder of the main or pressure-balanced actuator. The opposite end plate 331ª of the casing is provided with a sleeve 332 having oppositely disposed valve seats 340 and 342 and provided at its outer end with a plug 334 having a threaded portion 333, which may be screwed into the rear end plate of the auxiliary actuator cylinder, or otherwise connected thereto. The end plate 331ª is also provided with air inlet apertures 345 and dust chamber 343. The expansible and contractable chambers A¹ and B¹ are formed in this instance by a cylindrical part 335 having a transverse partition 336 secured sealingly thereto and dividing it into two chambers, the outer end portions of which are formed by flexible diaphragms C and D respectively, and the necessary resilience being provided by springs S and S¹ interposed between the partition wall and parts connected with the respective diaphragms. The diaphragm C has its outer marginal portions secured sealingly to the cylindrical part 335 to form a wall of the chamber A¹ and is provided with a central aperture, the marginal edges of which are sealingly connected with the inner end of a movable valve sleeve 339, which extends through the sleeve 332 and has a guiding engagement in the plug 334. This sleeve carries a pair of oppositely disposed poppet valves for engaging the seats 340 and 342, of which the valve 346 is the suction valve, and the valve 346ª is the air inlet valve. The valves are pressed toward their seats by springs 346ᵇ and 346ᶜ, and are moved to open position by collars 339ª and 339ᵇ on the sleeve 339. These valves are preferably formed of compressed rubber, cork, or cork composition, or other suitable material, and engage the sleeve 339 with a sealing fit and are movable with and with respect to the sleeve. The collars 339ª and 339ᵇ are so located that both valves may be seated at the same time, and a movement of the sleeve in either direction will open one valve after permitting the other to be seated under the action of its spring. The valve sleeve 339 is provided with apertures 339ᶜ between the valves for the purpose of placing the interior of the sleeve 339, and therefore the chamber A¹, and the auxiliary actuator cylinder in rear of its piston in communication with suction through the suction connection 326ᵈ, when the suction valve is unseated, or with the atmosphere through the apertures 345 and the air strainer, when the air inlet valve is unseated. The spring S is interposed between the inner end of the sleeve 339 and the central partition 336.

The rear end of chamber B¹ is formed by the diaphragm D, the outer edges of which are sealingly secured to the cylindrical part 335. This diaphragm is provided with a central aperture, the marginal edges of which are sealingly secured between the pipe 348 and the cover plate 331, and this aperture is in communication with the closed end of the cylinder of the main actuator. The spring S¹ is interposed between the central partition 336 and the pipe 348, or the rear end of the casing 330, and this spring is under slightly greater tension than the spring S and strong enough to enable it to overcome the resistance of the valve actuating springs 346 and 346ᶜ, as hereinafter explained.

Figure 12 illustrates the position of the parts when the engine is not running and no suction exists. In such case fluid pressures are balanced and the valve actuating sleeve 339 is held in position to unseat the suction valve 346 and establish communication between chamber A¹ and the rear end of the vacuum-balanced auxiliary actuator cylinder and the suction pipe 326ᵈ by reason of the fact that the combined tension of the springs S and S¹ is sufficiently strong to overcome the tension of the springs 346 and 346ª of the suction and air inlet valves.

Figure 13:
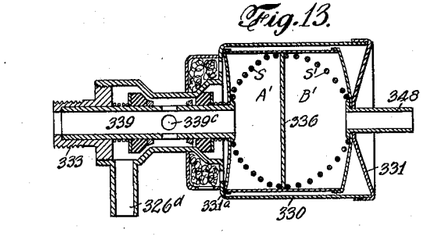
Figure 13 is a similar view drawn to a smaller scale showing the position of the parts when the engine is running and the brakes are released.

In Figures 13 to 17 inclusive, we have illustrated in a manner corresponding to that exemplified in Figures 4 to 8 inclusive, the relative positions of the parts of this valve mechanism at different steps in the operation. Figure 13 shows the positions of the parts after the engine has been started and the suction in the manifold has effected the evacuation of the suction pipe, the chamber A¹ and the portion of the auxiliary actuator cylinder in rear of the piston. As chamber B¹ is in communication with the atmosphere through the main actuator cylinder and the controlling valve mechanism therefor, as previously described with reference to Figures 1 to 8, the atmospheric pressure in chamber B acts on the central partition, the opposite face of which within the chamber A is exposed to vacuum, so as to move the cylindrical part toward the end wall 331ª of the casing, compressing spring S and increasing its tension to overcome the action of the diaphragm C in the opposite direction, and pressing the valve sleeve 339 in a direction to maintain the suction valve open and the air valve closed, the differential of fluid pressures on the partition plate 336 being greater than those on the diaphragm C by reason of its greater area exposed to differential pressures.

Figure 14:
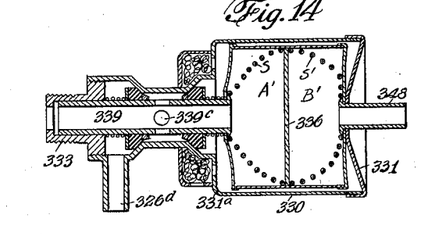
Figure 14 is a sectional view similar to Figure 13 showing the parts in the position which they occupy immediately after the operation of the main valve to apply the brakes.
Figure 15:
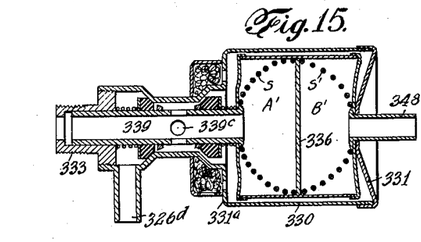
Figure 15 is a similar view showing the parts in the position which they occupy during the initial application of the auxiliary brakes.
Figure 16:
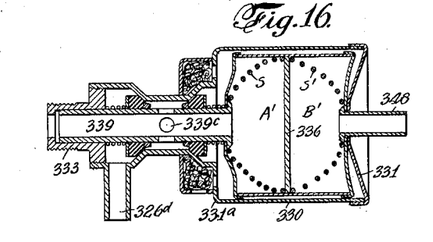
Figure 16 is a similar view showing the position of the parts when the brakes are held partly applied.
Figure 17:
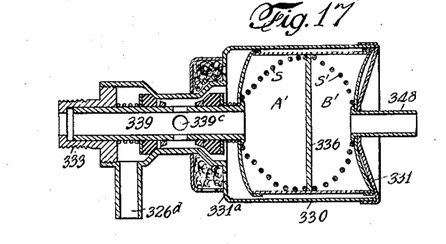
Figure 17 is a similar view showing the position of the parts when the brakes are applied with maximum power of the actuator.

When the operator depresses the pedal to operate the main controlling valve mechanism and apply the brakes, the main actuator cylinder will be connected to suction and the reduction of pressure therein will be communicated to chamber B¹, as indicated in Figure 14, reducing pressure therein until the reduction of the differential of fluid pressures on the partition 336 permits the differential of pressures on the diaphragm C to effect a movement of the valve sleeve to the right as shown in these figures, first closing the suction valve 346, as shown in Figure 14, and thereafter opening the air inlet valve 346ª, as shown in Figure 15. This permits air to enter through the air inlet apertures 345 in the casing 330 and pass to the chamber A¹ and the auxiliary actuator cylinder in rear of the piston to effect a movement of the auxiliary actuator piston nearly simultaneously with that of the main actuator piston. The increase of pressure in chamber A¹, if not accompanied by continued rarification in chamber B¹, as in the case where the operator stops the depression of the pedal after a partial application of the brakes is secured, will reduce the differential of fluid pressures on the diaphragm C and permit the spring S to move the sleeve 339 to the left to permit the air inlet valve 346ª to close and hold the brakes as applied, as illustrated in Figure 16. Further pressure may be applied to the brake pedal as previously described, and when the brakes are fully applied with the maximum force of the power actuators, chamber A¹ is at atmospheric pressure, and chamber B¹ is under maximum vacuum, and the parts of the automatic valve will be in the positions shown in Figure 17, in which the spring S is under minimum compression and the spring S¹ is under maximum compression, due to the maximum differential of fluid pressures on the partition 336 which forces the cylindrical part 335 to the right, holding the atmospheric valve open by means of the diaphragm C, which is shown slightly flexed under the strain.

It is to be understood that in carrying my invention into effect, both the main valve mechanism and the automatic valve mechanism may each control a single actuator or a plurality of actuators. As illustrative of this, we have shown in Figure 10 for example, the cylinder 201 provided with a pipe 201ᵇ for connecting the forward end of the cylinder with the corresponding portion of another pressure-balanced cylinder, said pipe being shown provided with a cock 201ᶜ for closing it when only one cylinder is employed. We have also shown the vacuum-balanced actuator cylinder 201ᵃ provided with pipes 201ᵈ and 201ᵉ for connecting the portions thereof on opposite sides of the piston with the corresponding portions of another vacuum-balanced cylinder, and said pipes are shown provided with cocks indicated respectively at 201ᶠ and 201ᵍ for closing said pipes when only one vacuum-balanced cylinder is employed, as shown in Figure 10.

The present case constitutes a substitute application for abandoned application No. 407,036, filed November 14, 1929.

We claim:

1. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting the pressure-balanced actuator with suction and with a higher fluid pressure source, and automatic controlling valve mechanism for said vacuum-balanced actuator, operatively connected with the pressure-balanced actuator and responsive to the changes in the differential of fluid pressures therein, for connecting a portion of the vacuum-balanced actuator with suction and with a higher fluid pressure source inversely as the pressure-balanced actuator is so connected by the main controlling valve mechanism.

2. In a vacuum brake system for automotive vehicles provided with an internal combustion engine having a throttle controlled suction passage, the combination of a main actuator comprising a cylinder closed at one end and open at the other, and a piston provided with means for connecting it with brake mechanism, a physically operable controlling valve mechanism for connecting said cylinder with said suction passage and with a higher fluid pressure source, and normally connecting said cylinder with said source when the parts are in released position, of an auxiliary actuator comprising a cylinder closed at both ends, and a piston provided with means for connecting it with brake mechanism, means for connecting said auxiliary actuator cylinder forward of the piston at all times with said suction passage, and automatic valve mechanism for connecting said auxiliary actuator cylinder in rear of its piston with said suction passage and with the higher pressure source inversely as the main actuator cylinder, and provided with pressure responsive actuating means, communicating with said main cylinder.

3. In a vacuum brake system for automotive vehicles provided with an internal combustion engine having a throttle controlled suction passage, a power actuator comprising a cylinder closed at one end and open at the other end, and a piston in said cylinder, a physically operable main controlling valve mechanism for connecting the closed end of said cylinder with said suction passage and with a source of higher pressure, and maintaining it connected with said higher pressure source when in released position, an auxiliary power actuator comprising a cylinder closed at both ends, and a piston in said cylinder, means for connecting said pistons with brake mechanisms of the vehicle, and means for connecting said auxiliary cylinder forward of its piston at all times with said suction passage, of an automatic controlling valve mechanism for connecting said auxiliary cylinder in rear of its piston with said suction passage when in released position, said automatic valve mechanism being connected with the closed end of said main actuating cylinder, and responsive to variations in the differentials of fluid pressures in said main actuator to connect said portion of the auxiliary actuator cylinder with said suction passage and with a source of higher pressure inversely as the said main cylinder is so connected by the main controlling valve mechanism.

4. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting a closed end of the pressure-balanced actuator with suction and with a higher fluid pressure source, and automatic controlling valve mechanism for said vacuum-balanced actuator comprising valve means for connecting a portion of said auxiliary actuator with suction and with a higher fluid pressure source, and a pair of connected expansible and contractable variable pressure chambers operatively connected with said automatic valve mechanism and movable with and with respect to each other, one of said chambers communicating at all times with said portion of the auxiliary actuator, and having a part exposed on its exterior to the higher fluid pressure, the other of said chambers communicating at all times with said end of the main actuator, and said chambers being each provided with resilient means for normally holding them in position to connect the said portion of the auxiliary actuator with suction, said chambers being responsive to variations in the differential of fluid pressures in the main actuator to connect said portion of the auxiliary actuator with suction and with said higher fluid pressure source inversely as the main actuator is connected thereto by said main valve mechanism, and means independent of both valve mechanisms for connecting the auxiliary actuator on the opposite face of its piston with suction at all times.

5. In a vacuum brake system for automotive vehicles provided with an internal combustion engine having a throttle controlled suction passage, a power actuator comprising a cylinder closed at one end and open at the other end, and a piston in said cylinder, a physically operable main controlling valve mechanism for connecting the closed end of said cylinder with said suction passage and with a source of higher pressure, and maintaining it connected with said higher pressure source when in released position, an auxiliary power actuator comprising a cylinder closed at both ends, and a piston in said cylinder, means for connecting said pistons with brake mechanisms of the vehicle, and means for connecting said auxiliary cylinder forward of its piston at all times with said suction passage, of an automatic controlling valve mechanism comprising valve means for connecting said auxiliary cylinder in rear of its piston with the suction passage and with a source of higher fluid pressure independently of said main valve mechanism, and a pair of connected expansible and contractable pressure chambers, operatively connected with said valve means and movable with and with respect to each other, said chambers being each provided with resilient means holding them in position to connect said portion of the auxiliary cylinder in rear of its piston with said suction passage when in released position, one of said chambers being at all times in communication with said portion of the auxiliary cylinder, and having portions exposed to the higher fluid pressure, and the other chamber being at all times in communication with said main actuator cylinder, and having portions remote from the first mentioned chamber held from movement, said chambers operating said valve means to connect the portion of the auxiliary cylinder in rear of the piston with said suction passage and higher fluid pressure source inversely as the main cylinder is connected therewith by said main valve mechanism.

6. In a vacuum brake system for automotive vehicles provided with an internal combustion engine having a throttle controlled suction passage, the combination with brake mechanisms, a main actuator cylinder closed at one end and open at the other end, and a piston therein, a physically operable controlling valve mechanism connected with said cylinder, said suction passage and the atmosphere, and connecting said cylinder with the atmosphere when in released position, of an auxiliary actuator cylinder closed at both ends, a piston, a connection from said cylinder forward of the piston to said suction passage, and automatic valve mechanism comprising valve means for connecting said cylinder in rear of the piston, with the suction passage and with atmosphere, and a pair of connected and bodily movable pressure chambers connected with said valve means and communicating respectively with said closed end of the main actuator cylinder and with the auxiliary cylinder in rear of its piston, said chambers being provided with a rigid partition between them, and the chamber connected with the auxiliary cylinder having portions substantially parallel to said partition exposed to atmospheric pressure at all times, said chambers having resilient means tending to hold them in a predetermined position and to hold the valve means in position to connect said portion of the auxiliary cylinder in rear of the piston with said suction passage.

7. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting the pressure-balanced actuator with suction and with a higher fluid pressure source, and automatic controlling valve mechanism for said vacuum-balanced actuator comprising a casing provided with connections to suction and to said higher pressure source, and valve means including movable parts for controlling said connections, a pair of expansible and contractable chambers connected with said movable valve parts and located within said casing, separated by a partition and having parts movable with and with respect to each other, one of said chambers having portions held rigidly with respect to said casing, and communicating at all times with the pressure-balanced actuator, the other chamber communicating at all times with the pressure chamber of the vacuum-balanced actuator and having a portion at a distance from said partition and parallel thereto, connected with said valve means, and subjected at all times on its outer face to the higher fluid pressure, said chambers being each provided with resilient means, tending to hold said chambers and the valve parts connected therewith in position to connect the pressure chamber of the vacuum-balanced actuator cylinder with suction, and said chambers acting to automatically connect said portion of the vacuum-balanced actuator cylinder with suction and higher pressure inversely as the pressure-balanced actuator cylinder is connected therewith by the main valve mechanism.

8. In a vacuum brake system for automotive vehicles provided with an internal combustion engine having a throttle controlled suction passage, a power actuator comprising a cylinder closed at one end and open at the other end, and a piston in said cylinder, a physically operable main controlling valve mechanism for connecting the closed end of said cylinder with said suction passage and with a source of higher pressure, and maintaining it connected with said higher pressure source when in released position, an auxiliary power actuator comprising a cylinder closed at both ends, and a piston in said cylinder, means for connecting said pistons with brake mechanisms of the vehicle, and means for connecting said auxiliary cylinder forward of its piston at all times with said suction passage, of an automatic controlling valve mechanism comprising a valve casing, having a sleeve at one end communicating with the pressure chamber of the auxiliary actuator, valve means for connecting said portion of the auxiliary actuator with the suction passage and with the higher fluid pressure, a pair of expansible and contractable chambers located within said casing, separated by a common partition and having portions movable with and with respect to each other, one of said chambers being connected at the end remote from said partition to the casing and being in communication at all times with the main actuator cylinder forward of its piston, the other of said chambers being at all times in communication with the auxiliary actuator cylinder in rear of its piston, and having a wall parallel to the said partition operatively connected with said valve means and exposed on its outer face to the higher fluid pressure, and each of said chambers having resilient means tending to hold the chambers and said valve means in position to connect the auxiliary cylinder in rear of the piston with said suction passage.

9. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting the pressure-balanced actuator with suction and with a higher fluid pressure source, and automatic controlling valve mechanism for said vacuum-balanced actuator, comprising a casing having at one end a sleeve rigidly connected to the vacuum-balanced actuator to support said automatic valve mechanism, and communicating therewith in rear of its piston, a pair of expansible and contractable chambers in said casing divided from each other by a partition wall and having parts movable with and with respect to each other, one of said chambers having portions rigidly connected to the casing at the end remote from said sleeve and communicating at all times with the pressure-balanced actuator, the other chamber being in communication at all times with the pressure chamber of the vacuum-balanced actuator, and having a portion at a distance from said partition and substantially parallel thereto subjected at all times on its outer face to the higher fluid pressure and on its inner face to the pressure within said chamber, valve means comprising stationary and movable parts for connecting the said last mentioned chamber and the portion of the vacuum-balanced actuator cylinder connected therewith, with suction and with said higher fluid pressure source, said movable parts of the valve means being connected with said second mentioned chamber, said chambers being each provided with resilient means normally holding them and said movable valve parts in position to connect the auxiliary actuator cylinder with suction.

10. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting the pressure-balanced actuator with suction and with a higher fluid pressure source, and automatic controlling valve mechanism for said vacuum-balanced actuator comprising a casing having at one end a sleeve, connected with the vacuum-balanced actuator and provided with suction and air inlet ports, a pair of expansible and contractable chambers in said casing separated from each other by a common partition wall, one of said chambers being connected with the casing at the end remote from said sleeve and communicating at all times with the pressure-balanced actuator, the other chamber having an end wall movable with respect to the casing and exposed at all times on its outer face to the higher fluid pressure, said end wall being provided with a tubular member extending through said sleeve and establishing communication at all times between said chamber and the vacuum-balanced actuator, valve means operated by the longitudinal movement of said tubular member for controlling said suction and air inlet ports, said chambers being provided with resilient means normally holding said valve means in position to connect the vacuum-balanced actuator with suction, the movements of said expansible and contractable chambers with respect to each other and to said casing acting to automatically connect the vacuum-balanced actuator cylinder with suction and higher pressure inversely as the pressure-balanced actuator cylinder is connected therewith by the main valve mechanism.

11. In a vacuum brake system, the combination with a power actuator, pressure-balanced when in released position, and a power actuator vacuum-balanced when in released position, and means for connecting said actuators with brake mechanisms, of a physically operable main controlling valve mechanism for connecting the pressure-balanced actuator with suction and with a higher fluid pressure source, and automatic controlling valve mechanism for said vacuum-balanced actuator, operatively connected with the pressure-balanced actuator and responsive to the changes in the differential of fluid pressures therein, for connecting a portion of the vacuum-balanced actuator with suction and with a higher fluid pressure source inversely as the pressure-balanced actuator is so connected by the main controlling valve mechanism, a physically operable part connected with said main controlling valve mechanism and connected also with a brake mechanism of the vehicle.

12. In a vacuum brake system, the combination with a power actuator, pressure-balanced when in released position, means for connecting said actuator with certain brake mechanisms, a power actuator vacuum-balanced when in released position, connections therefrom to other brake mechanisms, of a main controlling valve mechanism for connecting the pressure-balanced actuator with suction and with a higher fluid pressure source, automatic controlling valve mechanism for said vacuum-balanced actuator, operatively connected with the pressure-balanced actuator and responsive to changes in the differential of fluid pressures therein, for connecting a portion of the vacuum-balanced actuator with suction and with said higher fluid pressure source inversely as the pressure-balanced actuator is so connected by said main controlling valve mechanism, an operator operated part connected with said main controlling valve mechanism and with a brake mechanism connected to one only of said actuators.

13. In a vacuum brake system for tractor and trailer, the combination with a power actuator, pressure balanced when in released position, located on the tractor, connections therefrom to tractor brake mechanisms, a power actuator, vacuum-balanced when in released position, located on the trailer, connections therefrom to trailer brake mechanisms, main controlling valve mechanism on the tractor for connecting the pressure-balanced actuator with suction and with a higher fluid pressure source, of automatic controlling valve mechanism for said vacuum-balanced actuator, operatively connected with the pressure-balanced actuator and responsive to the changes in the differential of fluid pressures therein, for connecting a portion of the vacuum-balanced actuator with suction and with said higher fluid pressure source inversely as the pressure-balanced actuator is so connected by the main controlling valve mechanism.

14. In a vacuum brake system for tractor and trailer, the combination with a power actuator, pressure-balanced when in released position, located on the tractor, connections therefrom to tractor brake mechanisms, a power actuator, vacuum-balanced when in released position, located on the trailer, connections therefrom to trailer brake mechanisms, main controlling valve mechanism on the tractor for connecting the pressure-balanced actuator with suction and with a higher fluid pressure source, of automatic controlling valve mechanism for said vacuum-balanced actuator, operatively connected with the pressure-balanced actuator and responsive to the changes in the differential of fluid pressures therein, for connecting a portion of the vacuum-balanced actuator with suction and with said higher fluid pressure source inversely as the pressure-balanced actuator is so connected by the main controlling valve mechanism, and an operator operated part on the tractor connected to said main valve mechanism and operatively connected with brake mechanism of the tractor.

15. In a vacuum brake system, the combination of brake mechanisms, a power actuator, pressure balanced when in released position, a power actuator, vacuum balanced when in its released position, means for connecting said actuators with said brake mechanisms, means for controlling the operation of one of said actuators to apply a portion of said brake mechanisms, and means dependent upon the variations in absolute pressure in said one actuator for simultaneously controlling the operation of said other actuator.

16. For use in a vacuum brake system which includes a pair of power actuators, a valve comprising a casing having at one end a sleeve adapted to be connected with one power actuator and provided with a partition wall and with suction and air inlet ports; a pair of expansible and contractable chambers in said casing separated from each other by said partition wall which is common to both of said chambers, one of said chambers being connected with the casing at the end remote from said sleeve and adapted to communicate at all times with the second power actuator, the other chamber having an end wall movable with respect to the casing and exposed at all times on its outer face to the higher fluid pressure, and said end wall being provided with a tubular member extending through said sleeve and establishing communication at all times between said chamber and the first mentioned actuator; and valve means operated by longitudinal movement of said tubular member for controlling said suction and air inlet ports, said chambers being provided with resilient means normally holding said valve means in position to contact the vacuum balanced actuator with suction, and the movements of said expansible and contractable chamber with respect to each other and to said casing acting to automatically connect the second actuator cylinder with suction and higher pressure inversely as the first mentioned actuator cylinder is connected therewith by said valve means.

17. A valve for use in a vacuum power brake system comprising a substantially cylindrical casing, a movable cylindrical member positioned in said casing, a pair of diaphragms, one positioned to close one end of said cylindrical member and the other positioned to close the opposite end of said cylindrical member, a partition dividing said cylindrical member into two chambers, a tubular member connected to one of said diaphragms and having a pair of collars secured thereto, a pair of annular valve members sleeved upon said tubular extension, springs acting upon said valve members and normally urging them toward said collars, and valve seats with which said valve members are adapted to be moved into contact.

18. In a vacuum brake system the combination of brake mechanisms, a power actuator, pressure balanced when in released position, a power actuator vacuum balanced when in released position, means for connecting said actuators with said brake mechanisms, valve means for controlling one of said actuators, and automatic valve means operated by variations in absolute pressure in one of said actuators for controlling the other said actuator.

19. For use in a brake system having a vacuum power motor and a vacuum line, a pressure controlled valve for automatically controlling said vacuum power motor comprising a casing including a tubular member formed with a port connected to the vacuum line and a port connected to the atmosphere, a longitudinal slidable inner sleeve member in said tubular member having means to connect the power motor controlled thereby with either of said ports to close it off from both, and means consisting of a diaphragm constituting the sole means for moving said slidable sleeve member.

20. In a vacuum brake system, the combination of brake mechanism, a power actuator, pressure balanced when in released position, a power actuator, vacuum balanced when in its released position, means for connecting said actuators with said brake mechanism, means for simultaneously operating said actuators to apply said brake mechanism, operator operated means for controlling one of said actuators, and means controlled by the variations in absolute fluid pressure in said last mentioned actuator for controlling the other actuator.

21. In a vacuum brake system for a tractor and a trailer, a fluid pressure brake system for the tractor, brakes for the trailer, a vacuum power actuator for the trailer brakes vacuum balanced when in released position, and means for controlling said power actuator for the trailer brakes comprising a valve having a portion exposed to the variations in absolute pressure of fluid in the fluid brake system for the tractor brakes, whereby application of the brakes on the tractor through said valve causes application of the brakes on the trailer.

CALEB S. BRAGG.
VICTOR W. KLIESRATH.